United States Patent [19]

Kellström et al.

[11] Patent Number: 5,474,388
[45] Date of Patent: Dec. 12, 1995

[54] MULTI-ROW SPHERICAL ROLLER BEARING HAVING CAGES

[75] Inventors: Magnus Kellström, Partille; Joacim Fogelström, Billdal, both of Sweden

[73] Assignee: Aktiebolage SKF, Goteborg, Sweden

[21] Appl. No.: 329,183

[22] Filed: Oct. 26, 1994

[30] Foreign Application Priority Data

Oct. 28, 1993 [SE] Sweden .................................. 9303538

[51] Int. Cl.⁶ ..................................................... F16C 33/48
[52] U.S. Cl. ........................................... 384/558; 384/572
[58] Field of Search ..................................... 384/558, 568, 384/572, 574, 575

[56] References Cited

U.S. PATENT DOCUMENTS

| | | | |
|---|---|---|---|
| 4,522,516 | 6/1985 | Neese | 384/575 X |
| 4,605,322 | 8/1986 | Alling et al. | 384/575 |
| 5,051,006 | 9/1991 | Van Voorthuijsen | 384/574 |
| 5,234,274 | 8/1993 | Honda et al. | 384/558 X |

Primary Examiner—Thomas R. Hannon
Attorney, Agent, or Firm—Burns, Doane, Swecker & Mathis

[57] ABSTRACT

A multi-row spherical roller bearing includes an inner race ring, an outer race ring, two rows of rollers, a cage for each row of rollers and a guiding ring disposed between the rows of rollers. The guiding ring is arranged to be guided only by the outer race ring, and the cages are arranged to be guided only by the guiding ring.

2 Claims, 3 Drawing Sheets

5,474,388

MULTI-ROW SPHERICAL ROLLER BEARING HAVING CAGES

BACKGROUND OF THE INVENTION

The present invention refers to a multi-row, spherical roller bearing incorporating an inner race ring, an outer race ring with a substantially spherical race track, at least two rows of rollers, and a cage for each row of rollers and a guiding ring provided between the rows of rollers. In particular, each cage incorporates a first radially outwardly extending flange, a second radially inwardly extending flange and a number of webs extending between the flanges, which webs form boundaries for roller pockets. The webs extend mainly parallel to the axes of the adjacent rollers and are situated between the bearing axis and the roller axis.

A bearing of this type is shown in European Publication No. 0 225 975 and in accompanying FIG. 1. The cages 16A in this bearing are guided by the inner race ring 11A or by the rollers 14A, 15A and the guiding ring 17A is guided by the cages. When compared to a bearing wherein the cage webs are arranged substantially level with the axes of the rollers, a bearing of this type can accommodate a larger number of rollers and/or longer rollers with bigger diameter, whereby the carrying capacity of the bearing is increased. Such a bearing operates extremely well in most assemblies except, e.g., in shaking sieves and other vibrating assemblies wherein the cages might undesirably contact the inner race ring and/or the rollers.

In the spherical bearings (shown in FIG. 2) intended for such shaking and vibrating applications, the guiding ring 17B is centered either against the race track of the outer race ring 12B or against the inner race ring 11B, depending on the size of the bearing. In these known embodiments the webs 20B of the cages are arranged substantially level with the axes of the rollers, thereby reducing the number of rollers that can be used.

SUMMARY OF THE INVENTION

The present invention intends to provide a spherical roller bearing having the same advantages as the bearing shown in European Publication 0 225 975 but which furthermore is suited for use in vibrating applications.

The invention involves a multi-row spherical roller bearing comprising an inner race ring, an outer race ring having a substantially spherical race track, at least two rows of rollers, a cage for each row of rollers, and a guiding ring disposed between the rows of rollers. Each cage includes a radially outwardly extending first flange, a radially inwardly extending second flange, and a number of webs extending between the flanges. The webs form roller pockets in which the rollers are disposed. The webs extend substantially parallel to the axes of adjacent rollers and are spaced from a center of the bearing by a first spacing which is different than a second spacing between the bearing center and the roller axes. The guiding ring is arranged to be guided by the outer race ring. The cages are arranged to be guided by the guiding ring. A first clearance is formed between each second flange and the inner race ring. The first clearance is greater than the sum of a first distance between the guiding ring and the outer race ring and a second distance between the guiding ring and the first flange. A second clearance is formed between the web and adjacent roller in a direction parallel to a reference line extending between the center of the adjacent roller and the center of the bearing. The second clearance is greater than the sum of the first and second distances.

Preferably, the first spacing is less than the second spacing.

BRIEF DESCRIPTION OF THE DRAWINGS

Hereinafter the invention is described with reference to the accompanying drawings in which an embodiment is shown for exemplifying reasons. It is to be understood that the invention can be modified within the scope of the claims.

DETAILED DESCRIPTION OF A PREFERRED EMBODIMENT OF THE INVENTION

Figure 1:
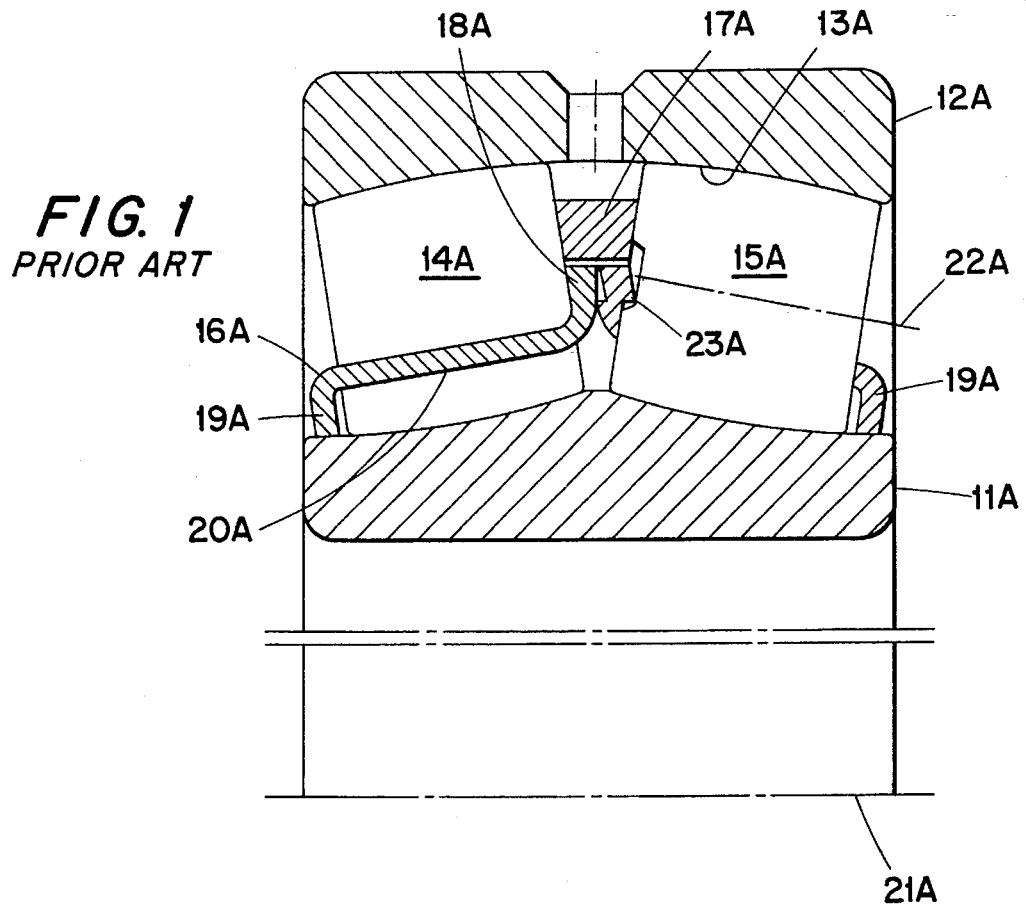
FIG. 1 shows an axial section through one prior art spherical roller bearing at rest.

FIG. 1 shows an earlier known spherical roller bearing of the type described in EP-B-O 225 975. This known roller bearing incorporates an inner race ring 11A, an outer race ring 12A having a substantially spherical race track 13A, two rows of rollers 14A, 15A, a cage 16A for each row of rollers and a guiding ring 17A provided between the rows of rollers.

The cage 16A incorporates a flange 18A extending radially outwardly and a flange 19A extending radially inwardly. A number of webs 20A extend between the flanges 18A, 19A, said webs forming the boundaries of pockets for the rollers 14A, 15A. The webs extend mainly parallel to the axes of the adjacent rollers and are situated between the bearing axis 21A and the axes 22A of the rollers. Thereby the webs will be situated in spaces normally formed between the rollers, whereby a maximum number of rollers can be accommodated in the bearing. The flanges 18A are provided with a projection 23A, which is adapted to engage within a recess in the opposed end surface of a roller.

Figure 2:
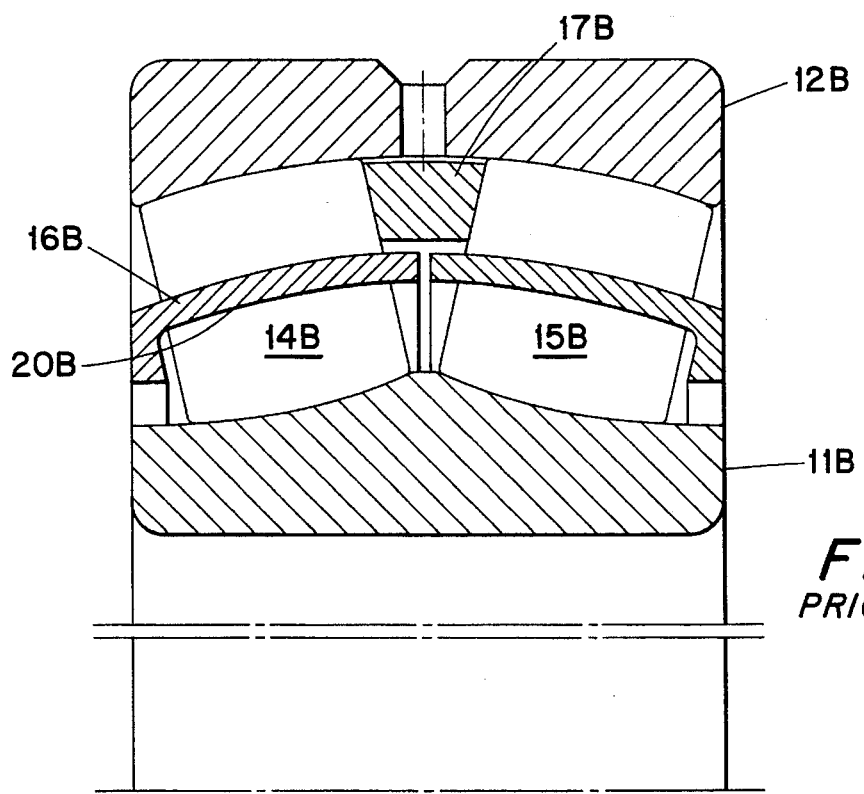
FIG. 2 is an axial section through another prior art spherical roller bearing at rest.

In another known bearing shown in FIG. 2, the cage 16B is provided with webs 20B arranged at a point along a radius of the bearing that is substantially level with the axes of the rollers, i.e., at the bigger diameter of the rollers. The guiding ring 17B is arranged to be guided on the race track of the outer race ring 12B. As further elucidated in the following part of this specification, this type of bearing is intended to be used in vibrating assemblies. Note that the location of the webs 20B in this type of bearing reduces the number of rollers that can be used.

Figure 3:
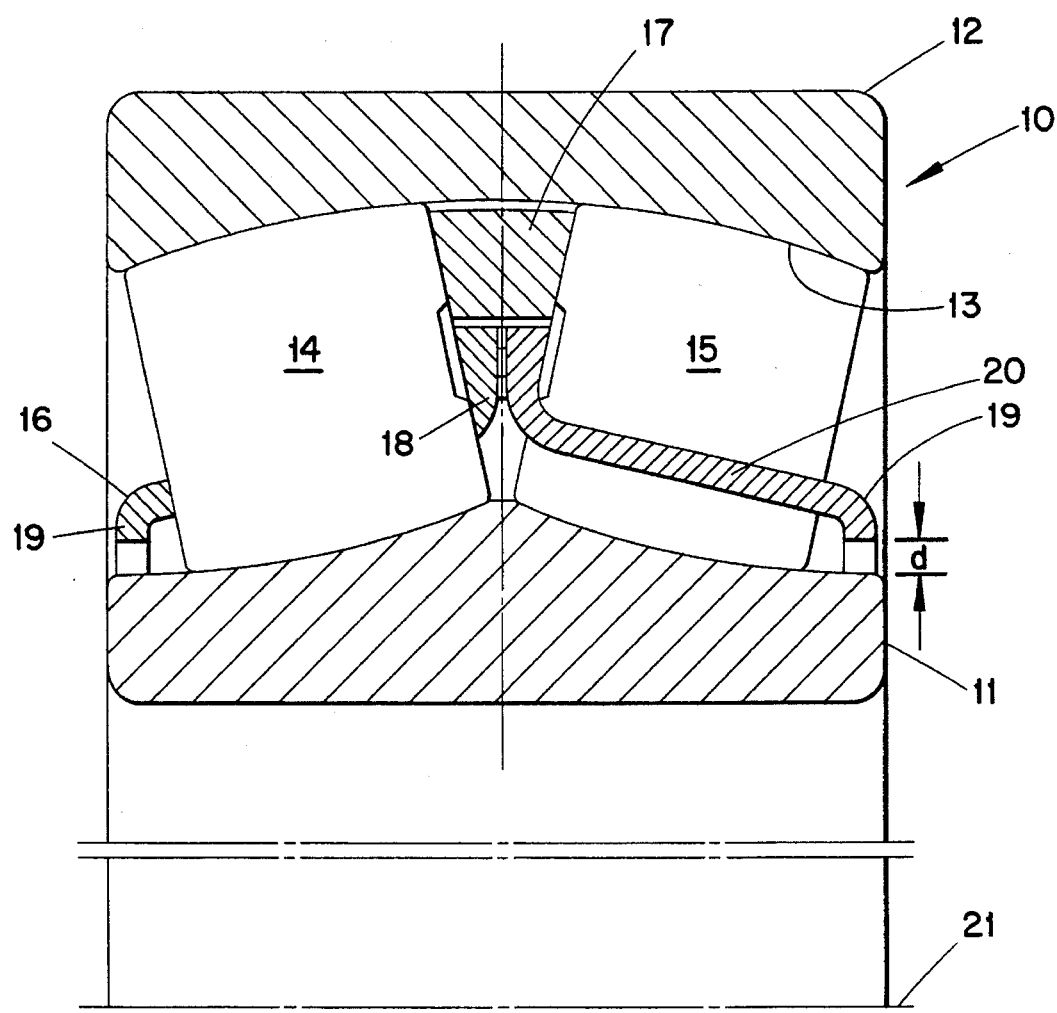
FIGS. 3 and 4 each show an axial section through a spherical roller bearing according to the invention at rest.

The present invention provides a spherical roller bearing combining the advantages obtained with the earlier known embodiments according to FIGS. 1 and 2. As depicted in FIG. 3, the cages 16 are principally designed in the same manner as in the embodiment according to FIG. 1, except for the fact that a clearance d is provided between the flanges 19 and the inner race ring 11, which clearance shall be big enough to ensure that the cages will not, in any position, contact and be guided by the inner race ring 11. The guiding ring 17 is arranged to be guided by the outer race ring 12 and the cages 16 are arranged to be guided by the guiding ring 17 via the flanges 18.

Due to the fact that the guiding ring 17 and the cages 16 are guided against the outer race ring 12 there will be obtained low forces acting upon the cages in vibrating applications, such as crank shaft motions. The lubrication between the guiding ring and the outer race ring during crank shaft motions is better than the lubrication that would exist if the cages were instead guided by the inner race ring, because an oil film is created at the contact surface by centrifugal force. During a crank shaft motion the relative rolling speed will be three times as great at the contact surface between the guiding ring and the outer race ring as compared to what it would be if the cages instead engaged the inner race ring. Since the thickness of the oil film increases with the rolling speed (due to greater centrifugal force), the oil film will become more than twice as thick at the outer race ring as compared to the inner race ring in order to provide the proper lubrication.

In order to ensure guiding of the guiding ring 17 against the outer race ring and guiding of the cages against the guiding ring 17, it is necessary that the bearing be designed to guarantee that the cages may not be guided (contacted) either by the inner race ring or by the rollers. A first prerequisite for meeting those two conditions is that the bearing according to the invention is designed so that with the bearing at rest, clearance d, between the flanges 19 and the inner race ring 11 is greater than the sum of the distance c between the guiding ring 17 and the outer race ring 12 and the distance b between the guiding ring 17 and the flanges 18 (see FIG. 4). Another prerequisite for meeting the two conditions is that with the bearing at rest, the clearance a between a web 20 and a roller 14, 15 in a direction parallel to a reference line 23 which extends between the center 24 of the roller 14 (or 15) and the center 25 of the bearing, is bigger than said sum of distances b and c.

It will be appreciated that during operation of the bearing, the distances b and c could become zero at some point around the bearing circumference, but clearances d and a can never become zero as long as the above two prerequisites are met. For example, during operation of the bearing, it is possible for centrifugal force to urge the ring 17 and webs 20 radially outwardly such that both of the distances b and c become zero at a first location around the circumference of the bearing. Accordingly, clearance d would be a maximum at such first location. In that condition, it will be appreciated that at a diametrically opposite second location of the bearing, the distances b and c will be a maximum and clearance d will be a minimum. However, in accordance with the first prerequisite (i.e., d>b+c when the bearing is at rest), the clearance d, at the second location, cannot have become zero. Furthermore, in accordance with the second prerequisite (i.e., a>b+c when the bearing is at rest), the clearance a at the first location cannot have become zero.

Figure 4:
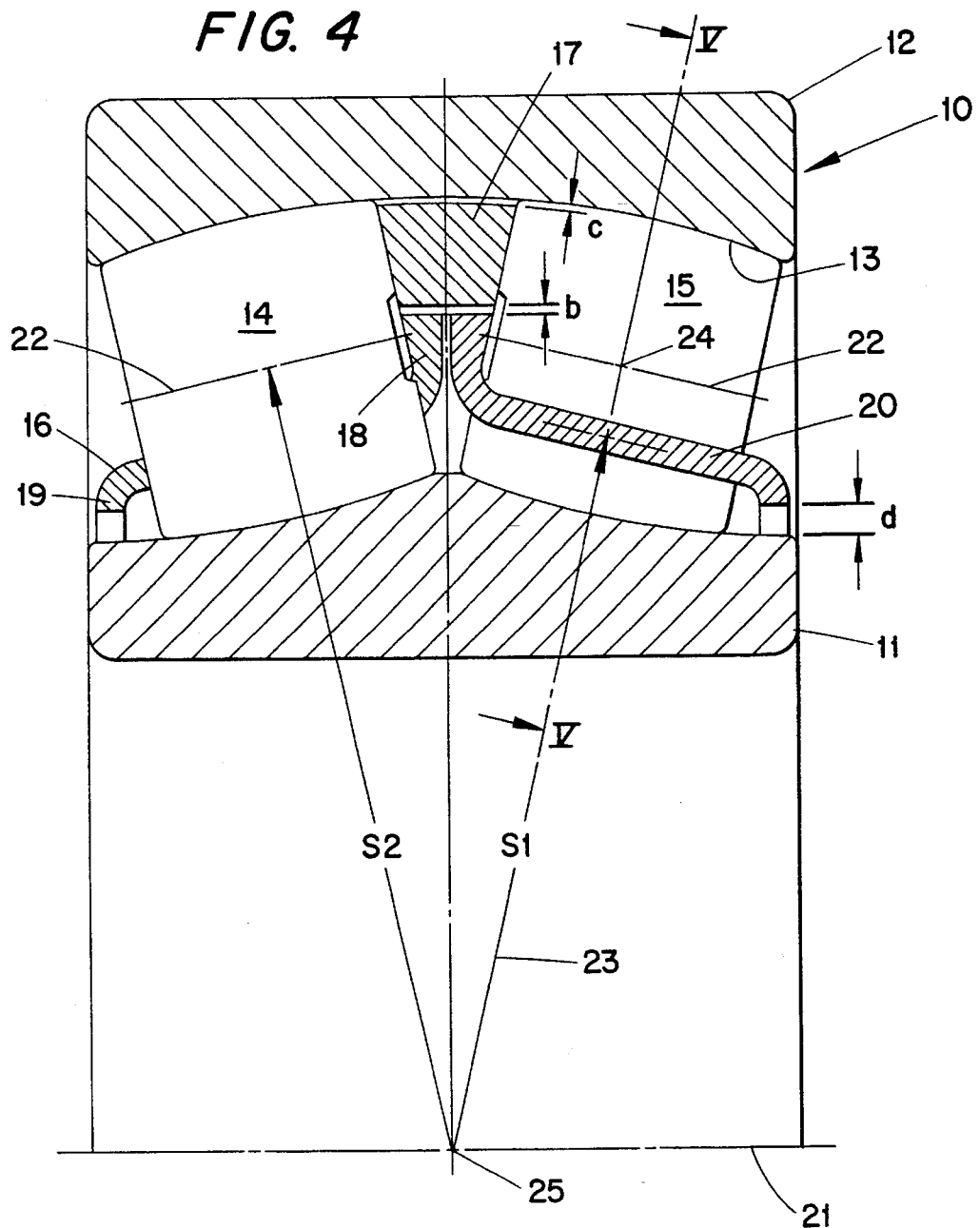
Figure 5:
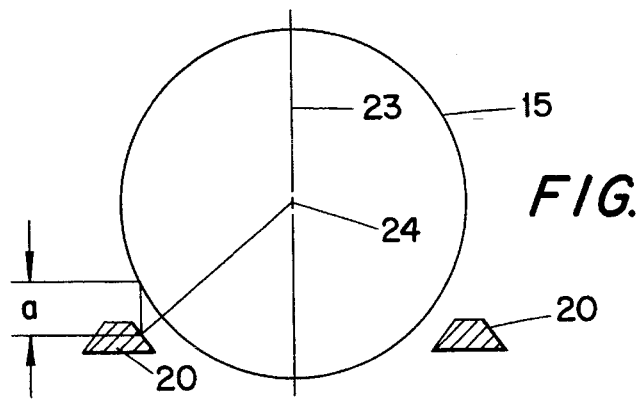
FIG. 5 is a sectional view taken along line V—V in FIG. 4 with the bearing at rest.

It will also be appreciated that within the scope of the present invention, the webs 20 could be spaced radially outwardly from the centers 24 of the rollers, instead of being spaced radially inwardly therefrom as shown in FIGS. 4 and 5. That is, while in FIG. 5 a first spacing S1 from the center 25 of the bearing to the web 20 is less than a second spacing S2 from the center 25 to the roller axes 22, it is instead possible for the first spacing S1 to be greater than the second spacing S2 within the scope of the invention.

It will be appreciated from the foregoing description of a preferred embodiment, the present invention enables a relatively large number of rollers and/or longer rollers to be used, with no chance of the cages contacting the inner race ring or the rollers.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

In the claims:

1. A multi-row spherical roller bearing comprising an inner race ring; an outer race ring having a substantially spherical race track; at least two rows of rollers; a cage for each row of rollers; and a guiding ring disposed between the rows of rollers; each cage including a radially outwardly extending first flange, a radially inwardly extending second flange, and a number of webs extending between the flanges; the webs forming roller pockets in which the rollers are disposed; the webs extending substantially parallel to the axes of adjacent rollers and being spaced from a center of the bearing by a first spacing which is different than a second spacing between the bearing center and the roller axes; the guiding ring arranged to be guided by the outer race ring; the cages arranged to be guided by the guiding ring; a first clearance being formed between each second flange and the inner race ring; the first clearance being greater than the sum of a first distance between the guiding ring and the outer race ring, and a second distance between the guiding ring and the first flange; a second clearance being formed between the web and an adjacent roller in a direction parallel to a reference line extending between the center of the adjacent roller and the center of the bearing; the second clearance being greater than the sum of the first and second distances.

2. The bearing according to claim 1, wherein said first spacing is less than said second spacing.

* * * * *